United States Patent [19]

Neumüller

[11] Patent Number: 5,002,140

[45] Date of Patent: Mar. 26, 1991

[54] METHOD OF AND APPARATUS FOR WEIGHING A CONTINUOUS STREAM OF FLUENT MATERIAL

[76] Inventor: Josef Neumüller, 3 Highgate Lane, Bryanston, Johannesburg, South Africa

[21] Appl. No.: 458,692

[22] PCT Filed: May 3, 1989

[86] PCT No.: PCT/EP89/00490

§ 371 Date: Mar. 1, 1990

§ 102(e) Date: Mar. 1, 1990

[87] PCT Pub. No.: WO89/11082

PCT Pub. Date: Nov. 16, 1989

[30] Foreign Application Priority Data

May 3, 1988 [ZA] South Africa ............... 883122

[51] Int. Cl.$^5$ ............... G01G 11/14; G01G 19/00; B67D 5/08

[52] U.S. Cl. .................... 177/16; 177/145; 222/55

[58] Field of Search ............ 177/16, 145; 222/55

[56] References Cited

U.S. PATENT DOCUMENTS

| | | | |
|---|---|---|---|
| 1,883,017 | 10/1932 | Sholtz ............... | 177/16 X |
| 4,108,344 | 8/1978 | Dahlberg ............. | 177/16 X |
| 4,166,510 | 9/1979 | Hege ................. | 177/16 |
| 4,788,930 | 12/1988 | Matteau et al. ...... | 177/16 |

Primary Examiner—George H. Miller, Jr.
Attorney, Agent, or Firm—Sughrue, Mion, Zinn, Macpeak & Seas

[57] ABSTRACT

A method of and an apparatus for weighing a continuous stream of fluent material (16) includes a weighing means (12) which, in use, in the direction of flow of the material, is arranged in a plane which is at an acute angle relative to a vertical plane; a load measuring means (14) for measuring the load imparted by the material (16) to the weighing means (12), the load measuring means (14) being arranged at substantially the same angle as the weighing means (12) to neutralise the effect of any frictional forces generated between the material (16) and the weighing means (12), and the load measuring means (14) being operable to generate a first signal representative of mass of the material; a speed measuring means (18) for measuring the speed of flow of the material (16) and for generating a second signal which is representative of the speed of flow of the material; and a processing means (38) for processing the first signal and the second signal to obtain an output signal which is representative of mass flow rate of the material.

5 Claims, 1 Drawing Sheet

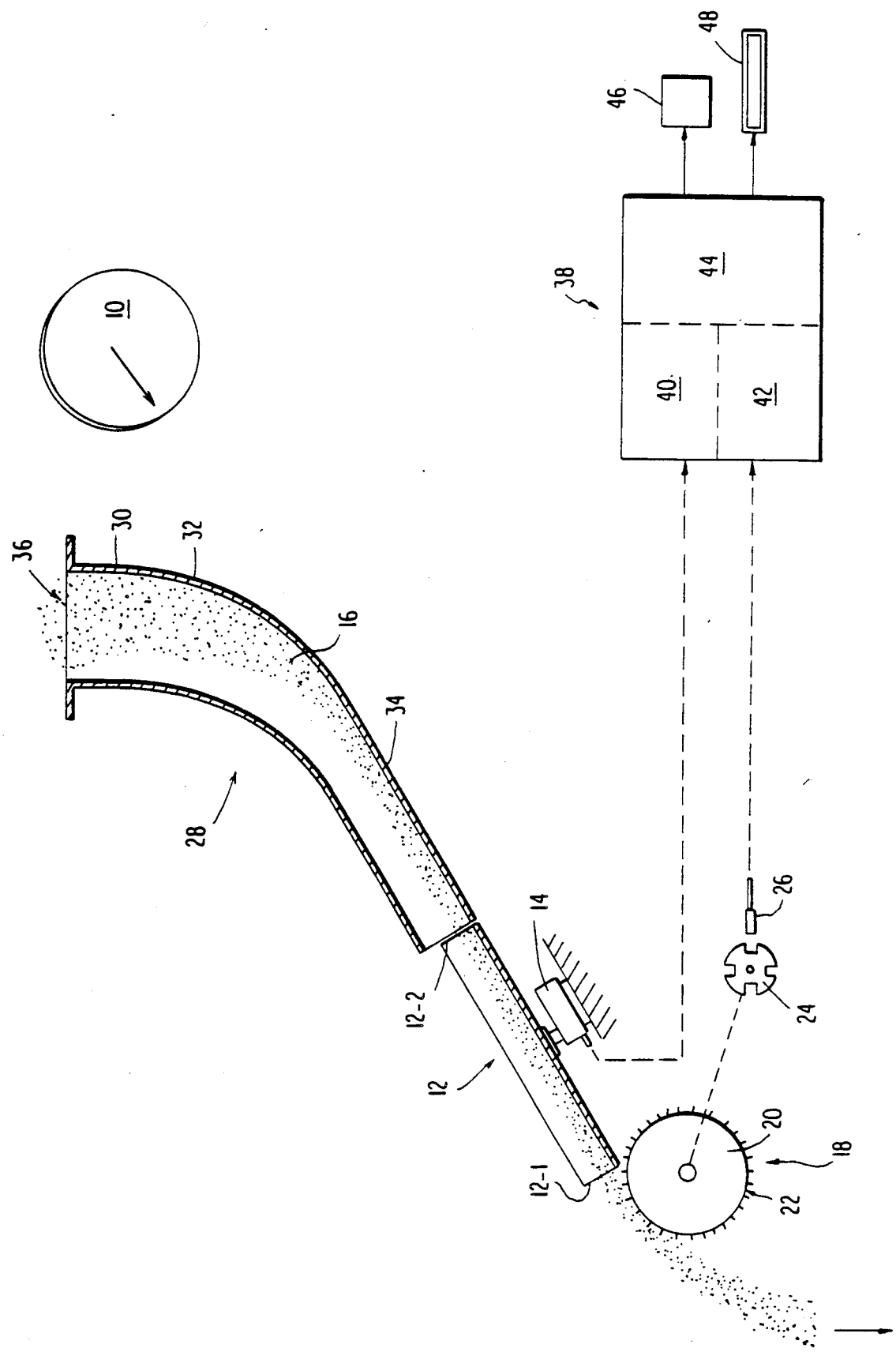

METHOD OF AND APPARATUS FOR WEIGHING A CONTINUOUS STREAM OF FLUENT MATERIAL

DESCRIPTION

This invention relates to the weighing of material. More particularly, the invention relates to a method of, and apparatus for, weighing a continuous stream of fluent material.

According to a first aspect of the invention, there is provided a method of weighing a continuous stream of fluent material which includes directing the material onto a weighing means which, in the direction of flow of the material is arranged in a plane at an acute angle relative to a vertical plane;

measuring, in a plane substantially parallel to the plane in which the weighing means is arranged, the load applied by the material to the weighing means and generating a first signal representative of mass of the material;

measuring the speed of flow of the material and generating a second signal representative of the speed of flow of the material; and processing the first signal and the second signal to obtain an output signal which is representative of mass flow rate of the material.

The weighing means may comprise a weigh chute and the method may then include feeding the material into the weigh chute by means of a feed means, at least that portion of the feed means arranged adjacent the weigh chute being arranged at substantially the same angle as the weigh chute and being co-axially aligned with the weigh chute. Those skilled in the art will appreciate that, by arranging the said portion of the feed means at the same angle as the weigh chute, the material arriving in the feed means is stabilised in the feed means and then traverses the weigh chute at a substantially constant speed.

Further, those skilled in the art will appreciate that, by measuring the load applied by the material to the weigh chute in a plane substantially parallel to the plane in which the weigh chute is arranged, the effect of any frictional forces generated between the material and the weighing means is neutralised and it is not necessary to compensate for such frictional forces.

According to a second aspect of the invention, there is provided apparatus for weighing a continuous stream of fluent material which includes a weighing means which, in use, in the direction of flow of the material, is arranged in a plane which is at an acute angle relative to a vertical plane;

a load measuring means for measuring the load imparted by the material to the weighing means, the load measuring means being arranged at substantially the same angle as the weighing means to neutralise the effect of any frictional forces generated between the material and the weighing means, and the load measuring means being operable to generate a first signal representative of mass of the material;

a speed measuring means for measuring the speed of flow of the material and for generating a second signal which is representative of the speed of flow of the material; and a processing means for processing the first signal and the second signal to obtain an output signal which is representative of mass flow rate of the material.

The weighing means may comprise a weigh chute through which the material can pass.

The apparatus may include a feed means for feeding the material into the weigh chute, at least that portion of the feed means arranged adjacent an inlet end of the feed means being at substantially the same angle as the weigh chute. The feed means may comprise a feed chute. The said portion of the feed means and the weigh chute may be similarly dimensioned and shaped. Further, the feed means and the weigh chute may be of a material having a low co-efficient of friction. Thus, conveniently, the feed means and the weigh chute may be of polished stainless steel.

The load measuring means may comprise a load transducer which supports the weigh chute.

The speed measuring means may comprise a speed measuring wheel having a ribbed surface on which the material impinges to rotate the wheel, the wheel being arranged at an outlet end of the weigh chute and the speed measuring means may further include a monitoring means for monitoring the speed of rotation of the wheel, the monitoring means generating the said second signal.

The invention is now described by way of example with reference to the accompanying diagrammatic drawing which shows a schematic sectional side view of apparatus, in accordance with the invention, for weighing a continuous stream of fluent material.

Referring to the drawing, apparatus, in accordance with the invention, for weighing a continuous stream of fluent material, is illustrated and is designated generally by the reference numeral 10.

The apparatus 10 comprises a weighing means in the form of a weigh chute 12 which is arranged in a plane which is at an acute angle relative to a vertical plane. A load measuring means in the form of a load transducer 14 supports the weigh chute 12. The transducer 14 is arranged at substantially the same angle as the weigh chute 12 thereby to neutralise the effect of frictional forces generated between the material 16 flowing through the weigh chute 12 and the weigh chute 12 itself.

A speed-measuring means 18 is arranged at an outlet end 12.1 of the weigh chute 12. The speed-measuring means comprises a speed measuring wheel 20 having a ribbed surface 22 on which the material 16 can impinge to cause the wheel 20 to rotate.

The wheel 20 is constructed of a relatively lightweight material to ensure low inertia and the wheel 20 is mounted on low-friction bearings to ensure that the running speed of the wheel 20 is proportional to the speed of the stream of material 16 leaving the weigh chute 12. A monitoring means in the form of a slotted disk 24 is fixed to a shaft on which the speed-measuring wheel 20 is mounted and the disk 24 rotates together with the wheel 20. The slotted disk 24 is operable to activate a proximity switch 26 which generates a signal comprising a pulse train representative of the speed of the stream of the material 16.

The apparatus 10 further includes a feed means 28 for feeding the material 16 into an inlet end 12.2 of the weigh chute 12. The feed means 28 comprises a feed chute 30 having a curved portion 32 leading into a substantially rectilinear portion 34. The rectilinear portion 34 is arranged at substantially the same angle as the weigh chute 12 and the load transducer 14. The shape of the feed chute 30 ensures that the material 16 arriving in the feed chute 30 via an inlet opening 36 of the feed chute 30 stabilises in the feed chute 30 and slides into the weigh chute 12 at a constant speed. The feed chute 30 and the weigh chute 12 are made of polished stainless steel to reduce frictional forces generated between the portion 34 of the feed chute 30 and the weigh chute 12 and the material 16 sliding through the chutes 12 and 30.

In use, the material 16 to be weighed is fed into the feed chute 30 through the inlet opening 36 thereof and due to the shape of the feed chute 30 the speed of the material is stabilised such that, when the material 16 flows into the weigh chute 12 the material is travelling at a substantially constant speed.

The load imparted by the material 16 to the weigh chute 12 is measured by the load transducer 14 and a first signal representative of mass of the material 16 is generated by the load transducer and is fed to a processing means 38. The material 16 exiting the weigh chute 12 impinges on the ribbed surface of the speed measuring wheel 20 causing it to rotate. The rotation of the wheel 20 causes the slotted disk 24 to rotate and this operates the proximity switch 26 to generate a second signal representative of the speed of the material 16. The second signal is also fed to the processing means 38.

The processing means 38 comprises an amplification means 40 for amplifying the signal received from the load transducer 14.

The processing means 38 further comprises a multiplier 42 for multiplying the signal output from the amplifier 40 and the signal received from the proximity switch 26. An output from the multiplier 42 is then filtered and fed to a scaling and pulse conversion module 44. The scaling and pulse conversion module 44 has two outputs which provide an indication of mass flow rate on a meter 46 and totalisation of material weighed on a display 48. The processing means 38 comprises standard electronic components which will be readily realisable to a person skilled in the art. Hence, the circuitry of the processing means 38 is not described any further.

It is an advantage of the invention that, other than the wheel 20, the apparatus 10 comprises no moving parts and hence the reliability of the apparatus 10 is improved in comparison with other weighing apparatus of which the applicant is aware. Further, due to the orientation of the load transducer 14 relative to the weigh chute 12, it is not necessary to compensate for the effect of frictional forces generated between the materials 16 and the weigh chute 12.

The apparatus 10 in accordance with the invention can be used for any free or semi-free flowing materials and can be built and calibrated according to any capacity requirement.

I claim:

1. A method of weighing a continuous stream of fluent material comprising the steps:
   directing the material onto a feed means which, in the direction of flow of the material is arranged in a plane at an acute angle relative to a vertical plane at least at the outlet thereof,
   feeding the material into a weigh chute which is completely arranged in a plane at an acute angle relative to a vertical plane, at least the outlet of the feed means geing arranged at substantially the same angle as the weigh chute, and being co-axially aligned with the weigh chute,
   measuring, in a plane substantially parallel to the plane in which the weigh chute is arranged, the load applied by the material to the weigh chute and generating a first signal representative of mass of the material;
   measuring the speed of flow of the material and generating a second signal representative of the speed of flow of the material; and
   processing the first signal and the second signal to obtain an output signal which is representative of mass flow rate of the material.

2. The method as claimed in claim 1, wherein the load applied by the material to the weigh chute is measured by a load transducer.

3. The method as claimed in claim 1 or 2, comprising the steps:
   amplifying the first signal;
   multiplying the amplified first signal and the second signal;
   filtering, scaling and pulse converting the multiplied signal;
   indicating the mass flow rate and the totalisation of material weighed.

4. Apparatus for weighing a continuous stream of fluent material (36) comprising:
   a feed means (28) which, in use, in the direction of flow of the material, is arranged in a plane which is at an acute angle relative to a vertical plane at least at the outlet thereof;
   a weight chute (12) through which the material can pass, which is completely arranged in a plane at an acute angle relative to a vertical plane, at least the outlet of the feed means (28) being arranged at substantially the same angle as the weigh chute (12), and being co-axially aligned with the weigh chute (12);
   a load measuring means (14) for measuring the load imparted by the material to the weigh chute (12), the load measuring means (14) being arranged at substantially the same angle as the weigh chute (12) to neutralise the effect of any frictional forces generated between the material and the weigh chute (12), and the load measuring means (14) being operable to generate a first signal representative of mass of the material;
   a speed measuring means (18) for measuring the speed of flow of the material and for generating a second signal which is representative of the speed of flow of the material; and
   a processing means (38) for processing the first signal and the second signal to obtain an output signal which is representative of mass flow rate of the material.

5. The apparatus as claimed in claim 4, wherein the load measuring means comprises a load transducer (14) which supports the weight chute (12).

* * * * *